US008975863B2

(12) United States Patent
Ranga et al.

(10) Patent No.: US 8,975,863 B2
(45) Date of Patent: Mar. 10, 2015

(54) CHARGING STATION FOR USE IN CHARGING ELECTRICALLY POWERED VEHICLES

(75) Inventors: Swamy Muddaiah Ranga, Plainville, CT (US); Heather Ellen Pugliese, Amston, CT (US); Cecil Rivers, Jr., West Hartford, CT (US); Philip Michael Banker, New Britian, CT (US)

(73) Assignee: General Electric Company, Schenectady, NY (US)

( * ) Notice: Subject to any disclaimer, the term of this patent is extended or adjusted under 35 U.S.C. 154(b) by 491 days.

(21) Appl. No.: 13/372,156

(22) Filed: Feb. 13, 2012

(65) Prior Publication Data

US 2013/0207606 A1 Aug. 15, 2013

(51) Int. Cl.
H02J 7/00 (2006.01)
(52) U.S. Cl.
USPC ............................................ 320/109
(58) Field of Classification Search
USPC ........................................ 320/109; 414/281
See application file for complete search history.

(56) References Cited

U.S. PATENT DOCUMENTS

| | | | | |
|---|---|---|---|---|
| 5,462,439 | A * | 10/1995 | Keith | 320/109 |
| 7,077,179 | B1 * | 7/2006 | Camiano et al. | 144/286.1 |
| 7,804,274 | B2 | 9/2010 | Baxter et al. | |
| 2011/0106329 | A1 | 5/2011 | Donnelly et al. | |
| 2011/0140656 | A1 * | 6/2011 | Starr et al. | 320/109 |
| 2011/0148350 | A1 * | 6/2011 | Wegener et al. | 320/108 |
| 2011/0174875 | A1 | 7/2011 | Wurzer | |
| 2011/0208953 | A1 | 8/2011 | Solomon et al. | |

OTHER PUBLICATIONS

Elektrobay, Ready for the Future of Transport, Electromotive Limited, 2009, USA, pp. 24.

Clipper Creek, Inc., Standard EVSE Pedestal Installation Guide, Clipper Creek, Inc. Product Catalogue, Nov. 2009, USA, pp. 8.
Car Charging Group, Inc., NYC Parking Firm Providing EV Charging, automotive FLEET The Car and Truck Fleet and Leasing Management Magazine, Jan. 4, 2011, USA, pp. 1.
Siemens Industry Inc., Siemens introduces VersiCharge electric vehicle charging stations, http://www.elp.com/index/display/elp-article-tool-template.electric-light-power.renewable-energy.energy-storage.2011.07.Siemens_introduces_VersiCharge_electric_vehicle_charging_stations_.html, Jul. 18, 2011, USA, pp. 1.
Siemens AG, Siemens community multi-level electric vehicle charging solutions, http://www.usa.siemens.com/electromobility/pdf/siemens-community-multi-level-ev-charging-station.pdf, USA, pages 2, accessed on Jan. 25, 2012.
Eaton, Eaton's Pow-R-Station electric vehicle charging station, Eaton Corporation Product Catalogue, USA, pp. 2, accessed on Jan. 25, 2012.

* cited by examiner

*Primary Examiner* — M'Baye Diao
(74) *Attorney, Agent, or Firm* — GE Global Patent Operation; Stephen G. Midgley (57) ABSTRACT

Charging stations for use in charging an electrically powered vehicle and related methods are disclosed. One example charging station includes a housing defining an interior and an opening configured to permit access to the interior, a door configured to substantially cover the opening, and a hinge assembly configured to provide a pivotal movement of the door relative to the housing between at least a closed position, a first open position, and a second open position. The hinge assembly includes a base member and a bracket including a projecting member. The projecting member and the base member are configured to permit removal of the door from the housing when the door is in the first open position. The projecting member and the base member are configured to prevent removal of the door from the housing when the door is in the second open position

16 Claims, 6 Drawing Sheets

CHARGING STATION FOR USE IN CHARGING ELECTRICALLY POWERED VEHICLES

BACKGROUND OF THE INVENTION

The subject matter disclosed herein relates generally to charging stations and methods and, more particularly, to charging stations having housings and doors pivotally and removably coupled thereto.

Electrically powered vehicles, including electric vehicles and plug-in hybrid electric vehicles, include electric motors powered by energy storage devices, such as batteries. Because an energy storage device is depleted of energy as the vehicle is operated, the operator of the vehicle must recharge the energy storage device prior to using the vehicle again.

At least some known vehicle charging stations are provided for use in various environments. Such charging stations are designed to charge electrically powered vehicles, while providing security and protection for components utilized in charging the vehicle. Charging stations include a variety of constructions to hold up to the environments in which the charging stations are installed. For example, various known charging stations include cabinets with one or more doors hingedly attached thereto. Such doors are generally attached by one or more external piano hinges, which restrict movement of the door and access to components within the cabinet. Other known charging stations do not include cabinets or housings, but instead, are constructed by assembly of sliding panels and/or modules pluggably coupled to one another. Maintenance and/or service of such charging stations often involve substantial disassembly of the panels and/or the modules to gain access to components included therein.

BRIEF DESCRIPTION OF THE INVENTION

In one aspect, a charging station for use in charging an electrically powered vehicle is provided. The charging station includes a housing defining an interior and an opening configured to permit access to the interior, a door configured to substantially cover the opening, and a hinge assembly configured to removably couple the door to the housing and to provide a pivotal movement of the door relative to the housing between at least a closed position, a first open position, and a second open position. The hinge assembly includes a base member coupled to one of the housing and the door and a bracket coupled to the other of the housing and the door. The base member defines an aperture. The bracket includes a projecting member configured to be operably disposed within the aperture. The projecting member and the base member are configured to permit removal of the door from the housing when the door is in the first open position. The projecting member and the base member are configured to prevent removal of the door from the housing when the door is in the second open position In another aspect, a charging station for use in charging an electrically powered vehicle is provided. The charging station includes a housing defining an interior and an opening configured to permit access to the interior, a door configured to substantially cover the opening, and a hinge assembly configured to removably couple to the door and the housing. The hinge assembly is configured to provide a pivotal movement of the door relative to the housing between at least a closed position and an open position. The hinge assembly is configured to permit removal of the door from the housing when the door is between the closed position and the open position. The hinge assembly is configured to prevent removal of the door from the housing when the door is in the open position.

In yet another aspect, a method for use in operating charging station for an electrically powered vehicle is provided. The method includes providing a door positioned in a closed position substantially covering an opening of a housing of a charging station for an electrically powered vehicle. A projecting member of a bracket coupled to the door and positioned within an aperture defined by a receptacle of the charging station. The method further includes rotating the door relative to the housing from the closed position to a first open position, and extracting a projecting member coupled to one of the door and the housing from an aperture of a base member to remove the door from the housing.

DETAILED DESCRIPTION OF THE INVENTION

The embodiments described herein relate generally to charging stations for charging electrically powered vehicles. More specifically, the embodiments described herein relate to charging stations having housings and doors pivotally and removably coupled thereto.

Figure 1:
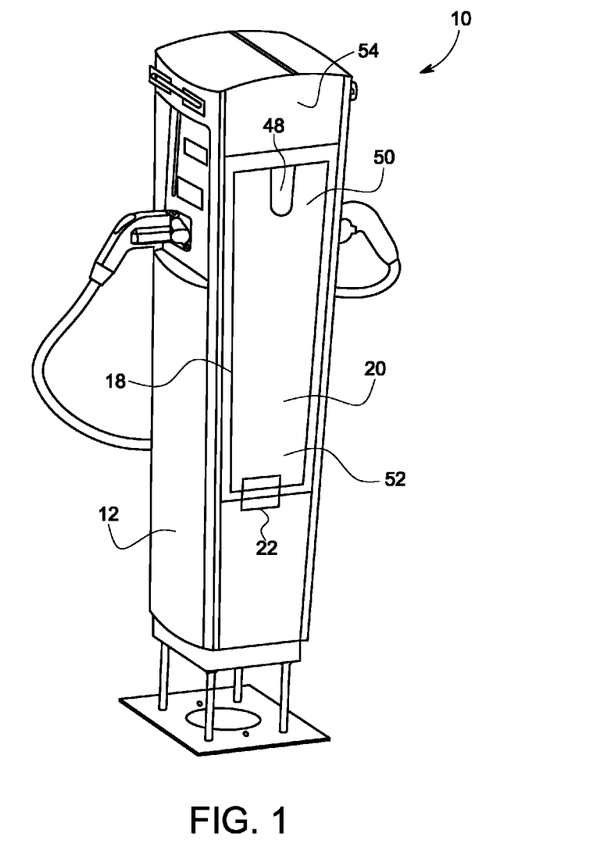
FIG. 1 is a perspective view of an exemplary charging station.
Figure 2:
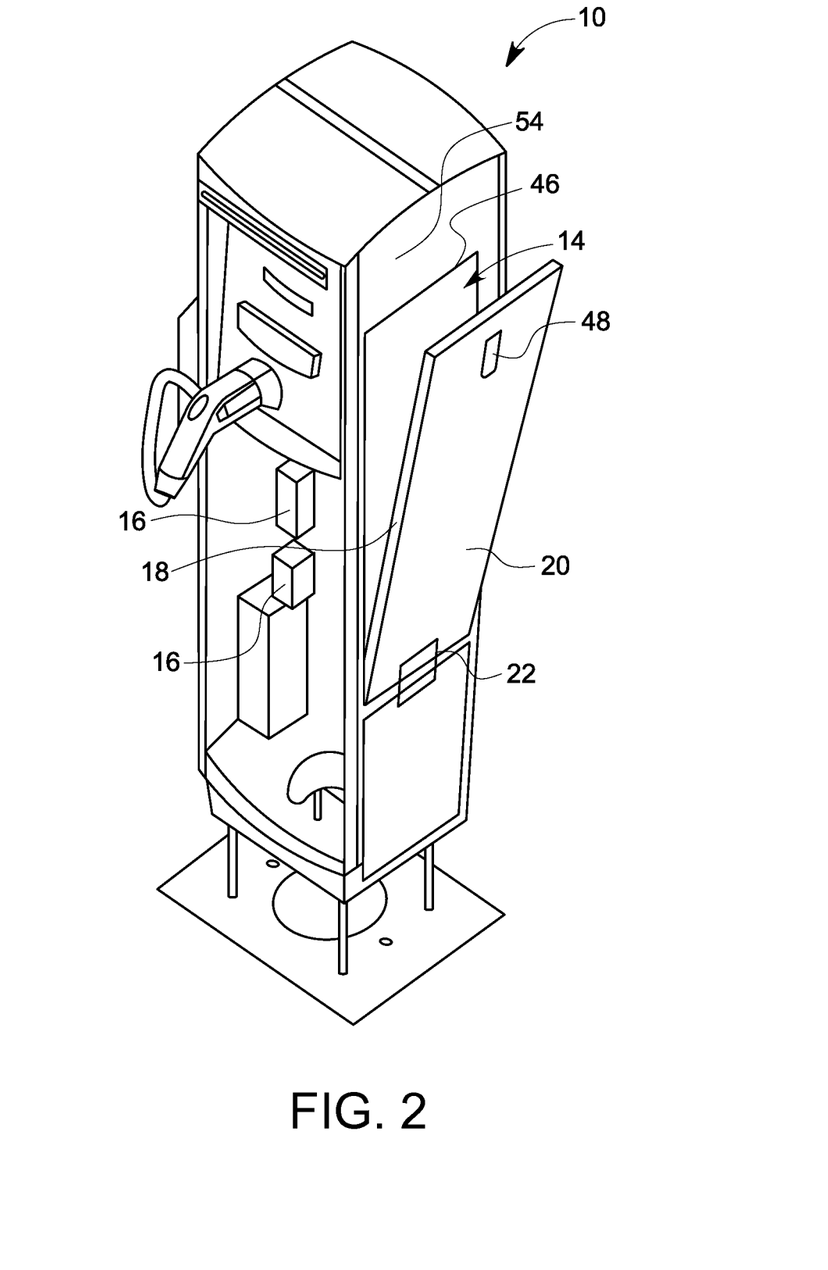
FIG. 2 is a perspective view of the charging station of FIG. 1, with a door in a first open position.
Figure 3:
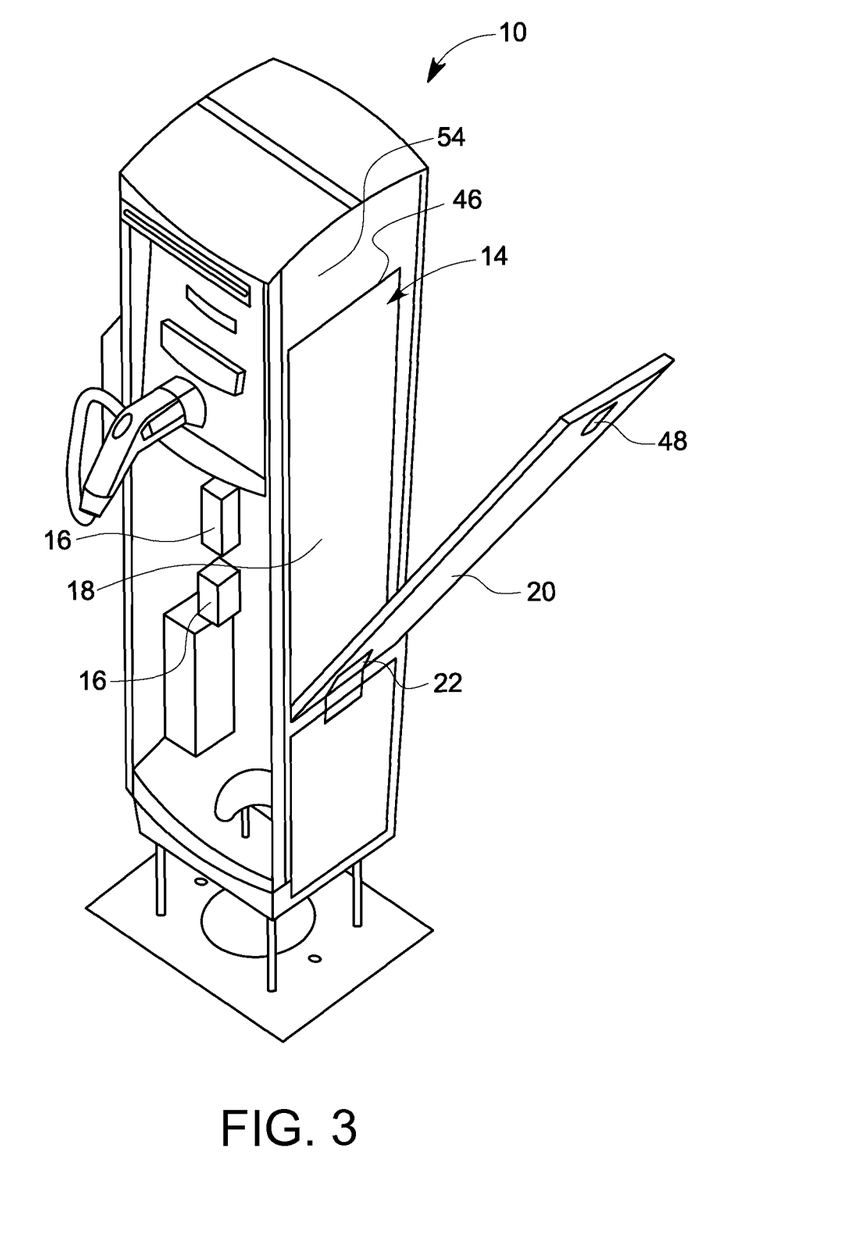
FIG. 3 is a perspective view of the charging station of FIG. 1, with a door in a second open position.

FIG. 1 illustrates an exemplary charging station 10 for use in charging an electrically powered vehicle (not shown). In the exemplary embodiment, charging station 10 includes a housing 12. As shown in FIGS. 2-3, housing 12 has an interior 14. Multiple vehicle charging components 16 are positioned within interior of housing 12. Vehicle charging components 16 may include, without limitation, power conduits, transmission lines, power converters, power conditioners, circuit breakers, switching devices, or other components used to provide energy transfer from charging station 10 to the electrically powered vehicle. Housing 12 is configured to at least partially enclose vehicle charging components 16 to protect such components from various environmental conditions, such as, for example, weather, debris, insects, and rodents, and/or to inhibit unauthorized access to vehicle charging components 16.

Housing 12 includes an opening 18 extending through a side wall 54 of housing 12, which is usable by a technician to access interior 14 to provide service to one or more of vehicle charging components 16. Opening 18 may be configured (e.g., by shape, size, position) to provide substantial access to vehicle charging components 16 and/or provide an aesthetic consistency with housing 12. In FIG. 1, for example, opening 18 has a substantially trapezoidal shape. In other examples, opening 18 may have a rectangular shape or non-rectangular shape. In the exemplary embodiment, charging station 10 further includes a door 20 configured to cover opening 18 when disposed in a closed position, as shown in FIG. 1. Door 20 generally includes a shape and/or size substantially consistent with, or complimentary to, opening 18. In the example shown in FIG. 1, door 20 also defines a substantially trapezoidal shape. In other embodiments, various other shapes and/or sizes of door 20 may be used to cover or partially cover opening 18.

Figure 4:
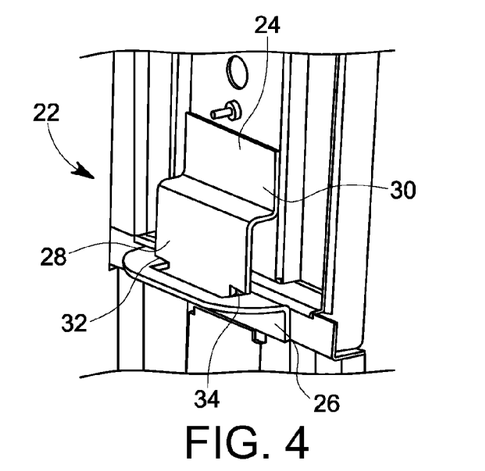
FIG. 4 is a sectional view of the charging station of FIG. 1, with the door in the closed position.
Figure 5:
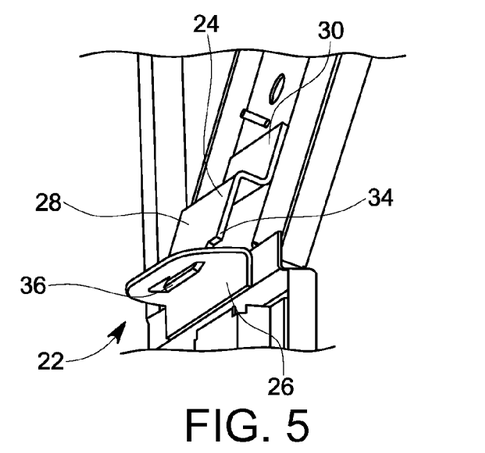
FIG. 5 is a sectional view of the charging station of FIG. 1, with the door in a first open position.

Door 20 is pivotally movable from the closed position to multiple open positions to permit access to interior 14 through opening 18, such as, for example, in FIGS. 2-3. Pivotal movement between door 20 and housing 12 is provided by hinge assembly 22, which is located within interior 14 when door 20 is in the closed position. Detailed views of hinge assembly 22 in the closed position, a first open position, and a second open position are shown in FIGS. 3-5, respectively. As shown, hinge assembly 22 includes a bracket 24 and a base member 26. In one embodiment, bracket 24 and base member 26 are coupled to door 20 and housing 12, respectively, as shown in FIGS. 3. Alternatively, in other embodiments, bracket 24 is coupled to housing 12, while base member 26 is coupled to door 20.

Figure 6:
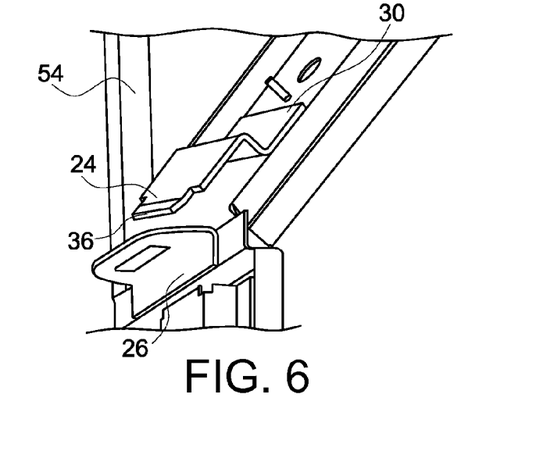
FIG. 6 is a sectional view of the charging station of FIG. 1, with the door in a second open position.
Figure 7:
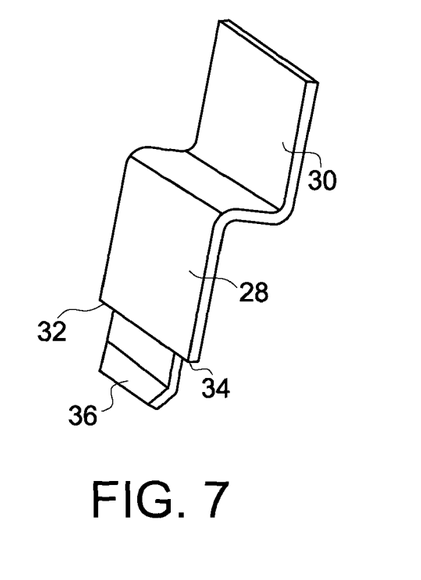
FIG. 7 is a perspective view of an exemplary bracket that may be included in the charging station of FIG. 1.
Figure 8:
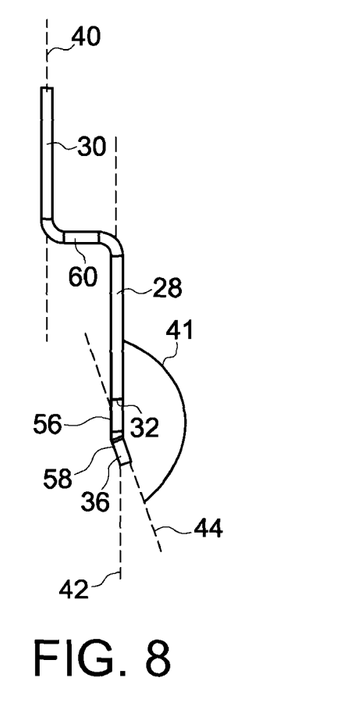
FIG. 8 is a side view of the bracket of FIG. 6.
Figure 9:
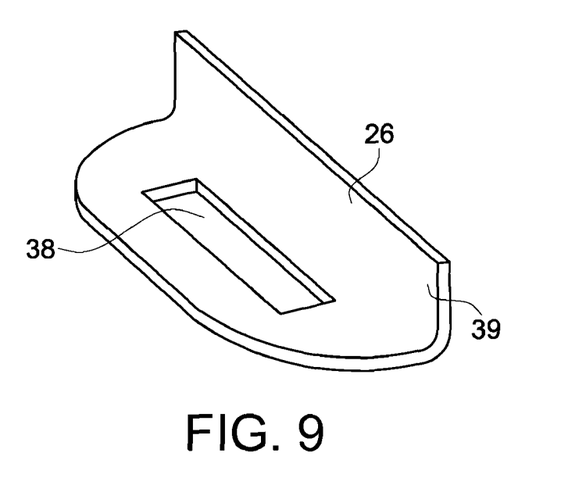
FIG. 9 is a perspective view of an exemplary base member that may be included in the charging station of FIG. 1.

Bracket 24 includes a projecting member 28 and a mounting member 30 coupled to projecting member 28, as shown in FIG. 6. In the exemplary embodiment, projecting member 28 includes two shoulders 32 and 34 and a tab 36 extending from shoulders 32 and 34. In the exemplary embodiment, mounting member 30 is coupled to one of door 20 and housing 12. Tab 36 is spaced from mounting member 30 and includes a first portion 56 and a second portion 58 extending at an angle from first portion 56. In one embodiment, as shown in FIG. 8, projecting member 28 and mounting member 30 are generally parallel to each other and are offset from each other (as indicated by lines 40 and 42). Bracket 24 further includes a first section 60 extending from projecting member 28 to mounting member 30, and which is angled with respect to both projecting member 28 and mounting member 30. It should be appreciated that various different shapes, sizes, and/or relative positions of projecting member 28 and mounting member 30 may be used in other bracket embodiments.

Tab 36 is configured to retain projecting member 28 within an aperture 38 (e.g., a hole, a notch, a slot etc.) within base member 26 at least when door 20 is disposed in a second open position. As shown in FIG. 8, second portion 58 is disposed at an angle 41 relative to first portion 56 of tab 36, as indicated by lines 42 and 44. In the exemplary embodiment, angle 41 is an obtuse angle, and more specifically, about 165 degrees. In various examples, angle 41 may include any angle between about 110 degrees and about 170 degrees. In other examples, angle 41 is an angle between about 150 degrees and about 170 degrees. It should be appreciated that other angles (e.g., obtuse, right, acute, or others) may also be defined between first portion 56 of tab 36 and second portion 58 of tab 36 in other embodiments.

In the exemplary embodiment, aperture 38 is configured to receive projecting member 28. More specifically, aperture 38 is sized and/or shaped to receive at least a portion of projecting member 28, as shown in FIGS. 4-6. Further, base member 26 includes a mounting member 39 configured to be coupled to housing 12. It should be appreciated that base member 26 and/or aperture 38 may be configured otherwise in one or more other embodiments, potentially depending on the configuration of bracket 24 and/or a mounting location of base member 26.

Moreover, in the exemplary embodiment, bracket 24 and base member 26 are constructed from stainless steel to inhibit corrosion of bracket 24, for example, due to paint peeling off during closing, opening and removal of the door. In other examples, one or more other materials may be used to construct bracket 24 and/or base member 26, provided the material(s) is sufficiently rigid and/or stiff to perform as described herein.

In the exemplary embodiment, as shown in FIG. 2, charging station 10 includes a gasket 46 disposed substantially about opening 18 and coupled to housing 12. Gasket 46 is configured to be compressed between door 20 and housing 12 to substantially seal opening 18 when door 20 is disposed in the closed position. In this manner, gasket 46 cooperates with door 20 and housing 12 to inhibit the ingress of, for example, weather, debris, insects, and rodents into housing 12. While gasket 46 is coupled to housing 12 in the exemplary embodiment, it should be understood that gasket 46 may be coupled to door 20 in other charging station embodiments. In at least one embodiment, gasket 46 includes single or multiple segments, disposed completely or partially about opening 18, with at least one of the segments mounted on housing 12 and/or at least one of the segments mounted on door 20. In such an embodiment, the gasket segments cooperate to substantially seal opening 18.

Referring again to FIG. 1, charging station 10 includes a latching mechanism 48 coupled between housing 12 and door 20. In the exemplary embodiment, latching mechanism 48 is configured to lock when door 20 is moved to the closed position, to prevent unauthorized access to charging station 10. Latching mechanism 48 may be keyed and/or operable by a specialized tool to substantially limit access to only authorized persons. As shown in FIGS. 1 and 4, latching mechanism 48 is coupled to a first end portion 50 of door 20, and bracket 24 is coupled to a bottom section 52 of door 20. In the exemplary embodiment, first end portion 50 is opposite bottom section 52. In other embodiments, the relative orientations of hinge assembly 22 and latching mechanism 48 may be different, potentially to provide efficient manufacture and/or latching of latching mechanism 48.

Figure 10:
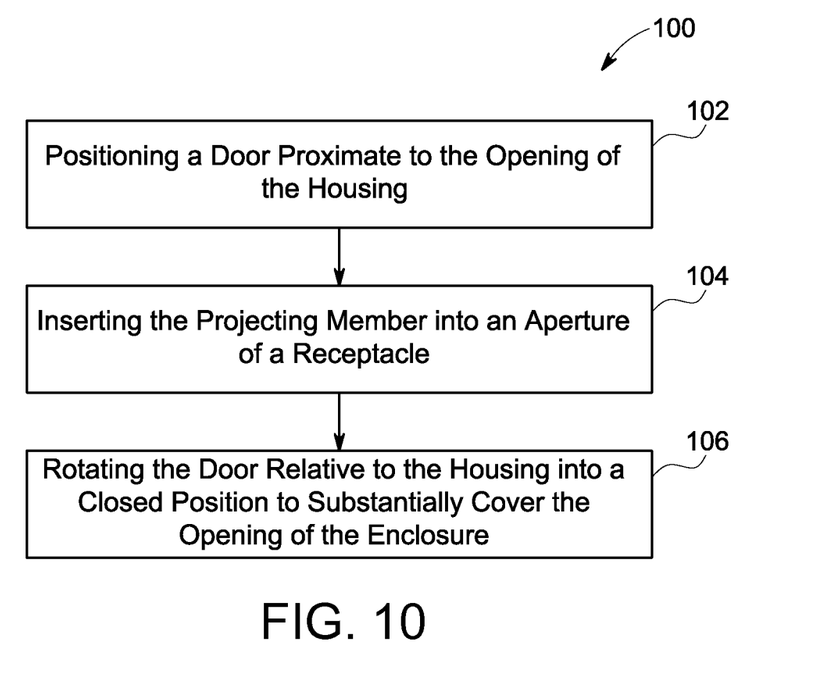
FIG. 10 is a block diagram of an exemplary method for use in assembling a charging station for charging an electrically powered vehicle.

FIG. 10 illustrates an exemplary method 100 for use in assembling charging station 10. While methods herein, including method 100, are described with reference to charging station 10, it should be appreciated that the methods herein are not limited to charging station 10 and may be used with other charging station embodiments. Similarly, charging station 10 should not be understood to be limited to the methods described with reference to FIGS. 10 and 11.

Method 100 includes positioning 102 a door, such as door 20 shown in FIG. 2, proximate to an opening, such as opening 18 of FIG. 2, and inserting 104 a projecting member, such as projecting member 28 of FIG. 4, into an aperture of a base member, such as base member 26 of FIG. 4. In the exemplary embodiment, inserting 104 the projecting member includes inserting the projecting member into the aperture until shoulders, such as shoulders 32 and 34 of FIG. 4, contact the base member. Communication between the projecting member and the base member prevent removal of the door in at least one open position. Upon insertion of the projecting member, method 100 includes rotating 106 the door relative to the housing into the closed position (as shown in FIGS. 1 and 4) to substantially cover the opening of the housing.

In the exemplary embodiment, because the hinge assembly is operable by inserting 104 the projecting member into the aperture, no fasteners are required to couple the door to the housing. As such, the door is removable without tools by rotating the door and sliding the projecting member, specifically a tab, such as tab 36 shown in FIG. 8, out of the base member. In this manner, a technician is permitted to remove the door and to access the interior of the housing, without the door at least partially impeding the opening. Accordingly, given configuration, size, and/or shape constraints often associated with charging station 10, a technician is provided with improved access to vehicle charging components within the housing, as compared to known charging stations with non-removable doors.

Furthermore, as illustrated in FIGS. 4-6, projecting member 28 permits door 20 to rotate relative to base member 26. At least partially due to tab 36 and the configuration of aperture 38, projecting member 28 prevents removal of door 20 from housing 12 when door 20 is positioned relative to housing 12 at one or more angles. Specifically, as shown in FIG. 5, door 20 is positioned at the first open position relative to housing 12 (also shown in FIG. 2), such that a technician is able to slide projecting member 28 from aperture 38 by applying a force inline with door 20 and away from housing 12. Conversely, as shown in FIG. 6, when door 20 is positioned at the second open position (also shown in FIG. 3), projecting member 28 and/or tab 36 contact base member 26 in response to the force described with reference to FIG. 4. In this embodiment, the contact prevents removal of projecting member 28 from within aperture 38, thereby preventing removal of door 20.

It should be appreciated that a threshold open position (not shown) exists between the first open position and the second open position, at which projecting member 28 transitions from permitting or preventing removal of door 20. More specifically, in the exemplary embodiment, when door 20 is between the closed position (shown in FIG. 1) and the threshold open position, hinge assembly 22 permits removal of door 20. Further, when door 20 is in the threshold open position or an open position beyond the threshold open position, hinge assembly 22 prevents removal of door 20. In other embodiments, threshold open positions can exist at various positions, in order to define various angles between door 20 and housing 12, at which door 20 is permitted or prevented from being removed. For example, if door 20 hinged from its top (rather than its bottom as shown in FIG. 2), hinge assembly 22 may be configured prevent removal between the closed position and the threshold open position, and permit removal at or beyond the threshold open position. In still other embodiments, hinge assembly 22 is configured to provide multiple threshold open positions.

In the exemplary embodiment, the first open position may be defined when door 20 is positioned at a predetermined angle relative to side wall 54 of housing 12, as shown in FIG. 2. The predetermined angle associated with the first position, for example, may be between about 5 degrees and about 30 degrees, as shown in FIG. 5. It should be appreciated that various predetermined angles between door 20 and side wall 54 of housing 12 may be defined at which door 20 is removable. For example, a range of angles for the first open position may be defined by the effects of gravity on door 20. Hinge assembly 22, for example, is disposed at the lower portion of door 20 as shown in FIG. 1. Accordingly, when unlatched, gravity biases door 20 into a fully opened position, for example, the second open position illustrated in FIG. 6. If door 20 is retained in the second open position by tab 36 and base member 26, door 20 is restrained from being removed.

Because gravity biases door 20 out of the first open position (as shown in FIG. 5) and into the second position, the potential for unintentional removal of door 20 may be reduced.

It should be appreciated that hinge assembly 22 may be oriented and/or positioned at various locations between door 20 and housing 12, to potentially inhibit unintentional removal of door 20, assist in removal of door 20, and/or other reasons related to the appearance, operation, and/or manufacture of other charging station embodiments.

Referring to FIG. 1, when door 20 is disposed in the closed position, bracket 24 and base member 26 are disposed within interior 14. Moreover, door 20 is disposed within opening 18 and/or interior 14. In this manner, charging station 10 provides improved resistance to unauthorized access, as compared to known charging stations with one or more hinges external to the charging station. Furthermore, by providing hinge assembly 22 within interior 14 when door 20 is disposed in the closed position, door 20 is capable of providing access to interior 14, while accommodating a variety of differently shaped doors and without substantially impacting the aesthetic appearance of charging station 10.

Figure 11:
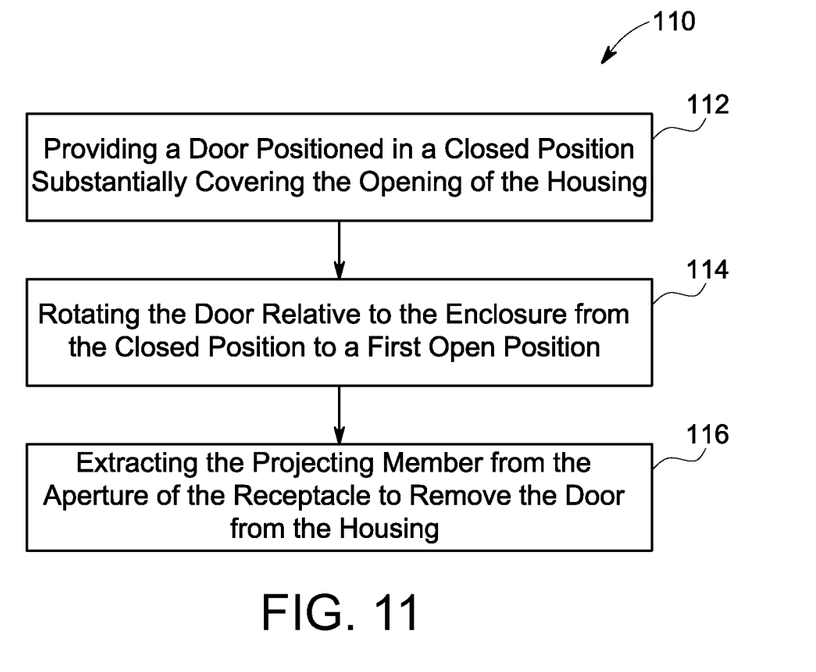
FIG. 11 is a block diagram of an exemplary method for use in operating a charging station for charging an electrically powered vehicle.

FIG. 11 illustrates method 110 for use in operating charging station 10 for an electrically powered vehicle. Method 110 includes providing 112 a door, such as door 20 of FIG. 1, positioned in a closed position substantially covering an opening of a housing, such as housing 12 of FIG. 1, rotating 114 the door relative to the housing from the closed position to a first open position, and extracting 116 a projecting member, such as projecting member 28 of FIG. 2, from an aperture of a base member, such as base member 26 of FIG. 4, to remove the door from the housing.

In at least one embodiment, rotating 114 the door relative to the housing to the first open position includes rotating the door to define a predetermined angle between the door and a side of the housing. The predetermined angle may be, for example, between about 5 degrees and about 60 degrees. Additionally, or alternatively, method 110 may include releasing latching mechanism, such as latching mechanism 48 of FIG. 1, configured to retain the door in the closed position, prior to rotating the door relative to the housing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A charging station for use in charging, an electrically powered vehicle, said charging station comprising:
   a housing defining an interior and an opening configured to permit access to the interior;
   a door configured to substantially cover the opening; and
   a hinge assembly configured to removably couple said door to said housing and to provide a pivotal movement of said door relative to said housing between at least a closed position, a first open position, and a second open position, said hinge assembly comprising a base member coupled to one of said housing and said door and a bracket coupled to the other of said. housing and said door, said base member defining an aperture, said bracket including a projecting member configured to be operably disposed within the aperture, said projecting member and said base member configured to permit removal of said door from the housing when said door is in the first open position, said projecting member and said base member configured to prevent removal of said door from the housing when said door is in the second open position.

2. The charging station of claim 1, wherein said base member and said projecting member are disposed within the interior when said door is in the dosed position.

3. The charging station of claim 1, wherein said projecting member includes at least one shoulder configured to contact said base member to limit extension of said projecting member through the aperture.

4. The charging station of claim 3, wherein said at least one shoulder comprises two shoulders on opposite sides of said bracket.

5. The charging station of claim 1, wherein said bracket comprises a mounting member coupled to said door, that is substantially parallel with and offset from said projecting member.

6. The charging station of claim 1, wherein said projecting member comprises a tab having a first portion and a second portion, said second portion configured to retain said projecting member within the aperture when said door is in the first open position.

7. The charging station of claim 6, wherein said second portion of said tab is angled at an obtuse angle with respect to said first portion of said tab.

8. The charging station of claim 1, further comprising multiple vehicle charging components at least partially enclosed within the interior.

9. The charging station of claim 1, further comprising a gasket coupled to at least one of said housing and said door and configured to substantially seal the opening, when said door is disposed in the closed position.

10. The charging station of claim 1, wherein said door has a trapezoidal shape.

11. The charging station of claim 1, further comprising a latching mechanism coupled to at least one of said housing and said door and configured to retain said door in the closed position.

12. A charging station for use in charging an electrically powered vehicle, said charging station comprising:
   a housing defining an interior and an opening configured to permit access to said interior;
   a door configured to substantially cover said opening; and
   a hinge assembly configured to removably couple to said door and said housing, said hinge assembly configured to provide a pivotal movement of said door relative to said housing between at least a closed position and an open position, said hinge assembly configured to permit removal of said door from said housing when said door is between the closed position and the open position, said hinge assembly configured to prevent removal of said door from said housing when said door is in the open position.

13. The charging station of claim 12, wherein said hinge assembly comprises a base member having an aperture extending therethrough and a bracket including a projecting member disposed within the aperture to provide relative movement between said door and said housing.

14. The charging station of claim 13, wherein said projecting member comprises a tab having a first portion and to second portion, said second portion configured to retain said projecting member within the aperture when said door is between the closed position and the open position.

15. The charging station of claim 14, wherein said second portion of said tab is angled with respect to said first portion of said tab.

16. The charging station of claim 12, wherein the opening has a trapezoidal shape.

* * * * *

UNITED STATES PATENT AND TRADEMARK OFFICE
CERTIFICATE OF CORRECTION

PATENT NO. : 8,975,863 B2  
APPLICATION NO. : 13/372156  
DATED : March 10, 2015  
INVENTOR(S) : Ranga et al.

Page 1 of 1

It is certified that error appears in the above-identified patent and that said Letters Patent is hereby corrected as shown below:

On the Title Page, in item (75), under "Inventors", in Column 1, Line 5, delete "New Britian," and insert -- New Britain, --, therefor.

In the Claims

In Column 6, Line 54, in Claim 1, delete "charging," and insert -- charging --, therefor.

In Column 6, Line 65, in Claim 1, delete "said." and insert -- said --, therefor.

In Column 7, Line 10, in Claim 2, delete "dosed" and insert -- closed --, therefor.

In Column 7, Line 36, in Claim 9, delete "opening," and insert -- opening --, therefor.

In Column 8, Line 27, in Claim 14, delete "and to" and insert -- and a --, therefor.

Signed and Sealed this  
Twenty-seventh Day of October, 2015

Michelle K. Lee  
*Director of the United States Patent and Trademark Office*